US012616184B2

(12) United States Patent
Khir et al.

(10) Patent No.: US 12,616,184 B2
(45) Date of Patent: May 5, 2026

(54) REAL-TIME MONITORING AND EARLY DETECTION SYSTEM FOR INSECT ACTIVITY IN GRAINS DURING STORAGE

(71) Applicant: THE REGENTS OF THE UNIVERSITY OF CALIFORNIA, Oakland, CA (US)

(72) Inventors: Ragab Khir, Davis, CA (US); Zhongli Pan, Davis, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 743 days.

(21) Appl. No.: 17/801,573

(22) PCT Filed: Feb. 24, 2021

(86) PCT No.: PCT/US2021/019325
§ 371 (c)(1),
(2) Date: Aug. 23, 2022

(87) PCT Pub. No.: WO2021/173609
PCT Pub. Date: Sep. 2, 2021

(65) Prior Publication Data
US 2023/0129551 A1     Apr. 27, 2023

Related U.S. Application Data

(60) Provisional application No. 62/980,952, filed on Feb. 24, 2020.

(51) Int. Cl.
*A01M 1/02*     (2006.01)
*G06T 7/11*     (2017.01)

(52) U.S. Cl.
CPC .............. *A01M 1/026* (2013.01); *G06T 7/11* (2017.01)

(58) Field of Classification Search
CPC .......... A01M 1/026; G06T 7/11; G06V 10/25; G06V 10/30; G06V 10/764
See application file for complete search history.

(56) References Cited

U.S. PATENT DOCUMENTS

| | | | |
|---|---|---|---|
| 5,646,404 A | 7/1997 | Litzkow et al. | |
| 9,664,813 B2 | 5/2017 | Jant et al. | |

(Continued)

FOREIGN PATENT DOCUMENTS

| | | |
|---|---|---|
| CN | 105976502 A | 9/2016 |
| CN | 205624024 U | 10/2016 |

(Continued)

OTHER PUBLICATIONS

H. Wu et al., "Multi-Mosquito Object Detection and 2D Pose Estimation for Automation of PfSPZ Malaria Vaccine Production," 2019 IEEE 15th International Conference on Automation Science and Engineering (CASE), Vancouver, BC, Canada, 2019, pp. 411-417, (Year: 2019).*

(Continued)

*Primary Examiner* — Stephen R Koziol
*Assistant Examiner* — Michael Kim Maiden
(74) *Attorney, Agent, or Firm* — Billion & Armitage

(57)     ABSTRACT

A system for real-time monitoring of insects includes a smart trap and an image processor. The smart trap includes a chamber with perforations sized to admit insects into an interior of the smart trap; a collection chamber located within the interior of the smart trap; and an imaging system for capturing images that include the collection chamber. The image processor is configured to receive images captured by the smart trap and to determine a count of insects within the collection chamber based on image analysis of the received image. Image analysis includes identifying a region within the received image corresponding with a boundary of (Continued)

the collection chamber, cropping the received image to the identified region to generate a cropped image, modifying at least one characteristic of the cropped image to generate a modified, cropped image, and determining a count of insects based on the modified, cropped image.

19 Claims, 17 Drawing Sheets

(56) References Cited

U.S. PATENT DOCUMENTS

| | | | |
|---|---|---|---|
| 2005/0025357 A1* | 2/2005 | Landwehr | A01M 3/005 |
| | | | 382/224 |
| 2010/0037512 A1 | 2/2010 | Durand | |
| 2011/0067293 A1 | 3/2011 | Schneidmiller et al. | |
| 2013/0223677 A1 | 8/2013 | Ots | |
| 2019/0034736 A1 | 1/2019 | Bisberg et al. | |
| 2019/0246616 A1 | 8/2019 | Pinheiro Pinto Sobreiro | |
| 2020/0404897 A1* | 12/2020 | Lillamand | A01M 1/106 |
| 2021/0000097 A1* | 1/2021 | Marchesini | A01M 7/0089 |

FOREIGN PATENT DOCUMENTS

| | | | | |
|---|---|---|---|---|
| CN | 107094729 A | | 8/2017 | |
| CN | 109684906 A | | 4/2019 | |
| CN | 109726615 A | | 5/2019 | |
| CN | 209268438 U | | 8/2019 | |
| CN | 110250123 A | * | 9/2019 | H04N 7/183 |
| KR | 20200017063 A | | 2/2020 | |
| WO | 2017120189 A1 | | 7/2017 | |

OTHER PUBLICATIONS

Ding, W., & Taylor, G. (2016). Automatic moth detection from trap images for pest management. Computers and Electronics in Agriculture, 123, 17-28. (Year: 2016).*

Wu, H., Mu, J., Da, T., Xu, M., Taylor, R. H., lordachita, I., & Chirikjian, G. S. (2019). Multi-Mosquito Object Detection and 2D Pose Estimation for Automation of PfSPZ Malaria Vaccine Production. IEEE International Conference on Automation Science and Engineering (CASE), 411-417. (Year: 2019).*

Ding, W., & Taylor, G. (2016). Automatic moth detection from trap images for pest management. Computers and Electronics in Agriculture, 123, 17-28. https://doi.org/10.1016/j.compag.2016.02.003 (Year: 2016).*

PCT/US2021/019325, "International Search Report and Written Opinion Received mailed Jun. 30, 2021", Jun. 30, 2021, 14 pages.

Wu, et al., "Multi-Mosquito Object Detection and 2D Pose Estimation for Automation of PISPZ Malaria Vaccine Production", Aug. 22, 2019, 7 pages.

"Extended European Search Report Received mailed on Jul. 7, 2023", 24 Pages.

"First Office Action Received mailed on Jul. 11, 2023", 8 Pages.

"Non-Final Office Action Mailed on Oct. 26, 2023", 4 pages.

"First Examination Report for IN Application No. 202237053217 mailed on Feb. 21, 2023", 7 Pages.

\* cited by examiner

REAL-TIME MONITORING AND EARLY DETECTION SYSTEM FOR INSECT ACTIVITY IN GRAINS DURING STORAGE

BACKGROUND

Insect infestation of stored grains negatively affects the grade of the stored grains, increases the grain temperature, and promotes the growth of microorganisms that cause spoilage and thereby further reduce grain quality. Consequently, an infestation can lead to significant financial losses for the grain growers and processors. The early detection of insect infestation is, therefore, an important need in the grain industry.

SUMMARY

According to one aspect, a system for real-time monitoring of insects includes a trap and an image processor. The trap includes a chamber with perforations sized to admit insects into an interior of the smart trap, a collection chamber located within the interior of the smart trap, and an imaging system for capturing images that include the collection chamber of the smart trap. The image processor is configured to receive images captured by the smart trap and to determine a count of insects within the collection chamber based on image analysis of the received image, wherein image analysis includes identifying a region within the received image corresponding with a boundary of the collection chamber, cropping the received image to the identified region to generate a cropped image, modifying at least one characteristic of the cropped image to generate a modified, cropped image, and determining a count of insects based on the modified, cropped image.

According to another aspect, a trap for detecting insects includes a perforated chamber with openings sized to admit insects into an interior of the trap, a collection chamber located within the interior of the smart trap for collecting admitted insects, and a cap configured to cover the perforated chamber, the cap housing an electronic system including an imaging system to capture an image of the collection chamber.

According to a further aspect, a method of counting insects in a captured image includes cropping and masking the captured image to produce a first processed image containing only a region in the captured image that correlates to a collection chamber, modifying at least one characteristic of the first processed image to produce a second processed image, and determining a count of insects in the captured image by executing a particle detection algorithm on the second processed image.

BRIEF DESCRIPTION OF DRAWINGS

This written disclosure describes illustrative embodiments that are non-limiting and non-exhaustive. Reference is made to illustrative embodiments that are depicted in the figures, in which:

FIG. 2A is a schematic diagram of a smart trap. FIG. 2B is a photo of a trap, according to some embodiments of this disclosure.

DETAILED DESCRIPTION

Early insect-detection is considered an effective technique to determine the optimal pest management practice to eliminate the infestation risk and maintain storage longevity, quality, grade, and safety of grains. The current methods of insect-detection in grains do not have the capability of real-time monitoring and early detection of insect activity in stored grains. Additionally, the current methods are inaccurate, time-consuming, and require trained personnel to identify the insect risk. Embodiments of the present disclosure describe systems and methods for early detection of insects in stored grains and/or for real-time detecting/monitoring of insect activity in stored grains.

An insect detection system 100 as described herein has high reliability and provides a highly accurate insect count. For example, in a laboratory test of an insect detection system 100 as described herein the emergence of the first insect was detected within 19, 18, 20, and 20 minutes under infestation concentrations of 0.5/kg, 1/kg, 2/kg, and 3/kg, respectively. The average image counting accuracy rate of the insect detection system 100 was 94.3%. Additionally, in a commercial test of an insect detection system 100 as described herein, insect activity was detected within twelve minutes with a counting accuracy of 91.3%.

In addition to being a low-cost system, an insect detection system 100 described herein decreases labor cost, increases the efficacy of pest management practice, enables early intervention/corrective action to be taken before the damage becomes severe, improves the quality, grade, and/or safety of stored grains, and/or decreases financial losses to grain growers and processors.

Figure 1:
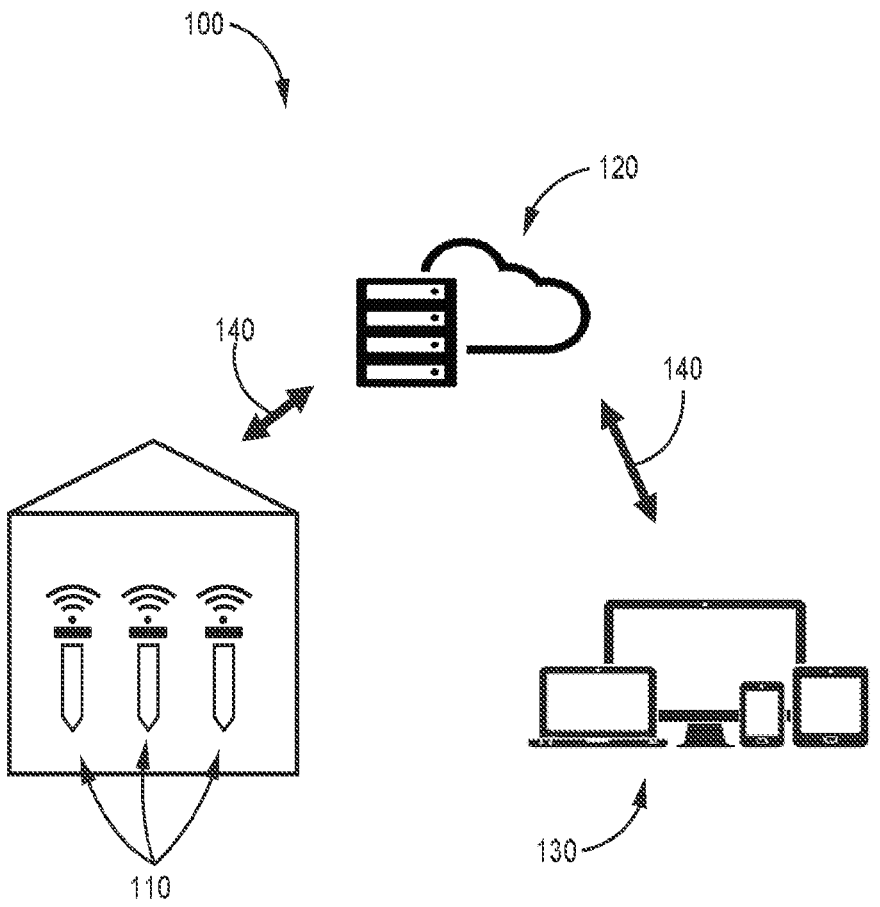
FIG. 1 shows an embodiment of an insect detection system.

Referring now to FIG. 1 an insect detection system 100 according to some embodiments of this disclosure is depicted. The insect detection system 100 includes at least one smart trap 110, at least one server 120, and at least one user interface/display device 130 which are communicatively coupled to one another via communication channel 140. In one aspect, the smart trap 110 is used to collect data in a facility storing grain. Any suitable wireless communication protocol may be used for communication between the smart trap 110, the server 120, and/or the user device 130. In one aspect, communication between the smart trap 110 and the server 120 and/or user device 130 are encrypted. In one example, a hypertext transfer protocol (HTTP) is used for communication between components 110, 120, 130 of the insect detection system 100. Communication of data and/or instructions may be done as a bundle or individually. Data may be saved to memory and/or processed by server 120 and/or user device 130.

Server 120 includes one or more devices capable of receiving, generating, storing, processing, and/or providing information. For example, server 120 may include a server, a data center, a workstation computer, a virtual machine (VM) implemented in a cloud computing environment, or a similar type of device.

The user device 130 includes one or more devices capable of receiving, generating, storing, processing, and/or providing information associated with interactions of a user of user device 130 with a user interface provided for display via a display associated with user device 130. For example, user device 130 may include a desktop computer, a mobile phone (e.g. a smartphone, a radiotelephone, etc.), a laptop computer, a tablet computer, a handheld computer, a gaming device, a virtual reality device, a wearable communication device (e.g. a smart wristwatch, a pair of smart eyeglasses, etc.), or a similar type of device. Although the example insect detection system 100 shows server 120 and user device 130 as separate components, server 120 and user device 130 may be a single component/device.

The insect detection system 100 further includes a user interface on server 120 and/or the user device 130 for remote operation of the insect detection system 100. Any suitable user interface may be implemented that allows an operator to interact with the user interface. For example, the user interface may be a graphical user interface (GUI), a webpage, and/or an application for a smartphone or tablet. Interacting with user interface elements includes selecting a button on the user interface, inputting text via a text box, toggling a control, and/or the like.

To monitor insect infestation of stored grain in real-time, at least one smart trap 100 is inserted into a grain mass. In one aspect, the number of smart traps 110 used in the system 100 depends on the size of the grain mass to be monitored. In one example, a system 100 implemented in a commercial grain storage facility utilizes 10-20 smart traps 110. The smart trap 110 collects data relevant to monitor insect infestation, e.g. images of an interior of the smart trap 110 and/or data about an ambient condition. In some embodiments, the user device 130 communicates one or more instructions to the trap 110. Instructions include an on-demand request to capture an image, and/or a schedule for data collection. One exemplary schedule for data collection is capturing an image one time per hour. Instructions may also include assigning an unassigned trap to a registered user and/or adding a new trap to the system.

The collected data may be processed by a microcontroller 211 located in the smart trap 110, the server 120, and/or the user device 130. Processed data may be stored in memory on server 120 and/or the user device 130. Stored data may be retrieved and/or viewed by the user interface. For example, the user interface may be used to access a database or list of smart traps. When the operator selects a smart trap, information about the smart trap will be displayed. Information that may be displayed includes the trap ID, trap location, detected insects per timespan, and sensor readings. In one aspect, the user device may be used to visualize data collected by the smart trap 110. In another aspect, the collected data is analyzed to determine a correlation between insect emergence and the temperature and relative humidity.

Figure 2A:
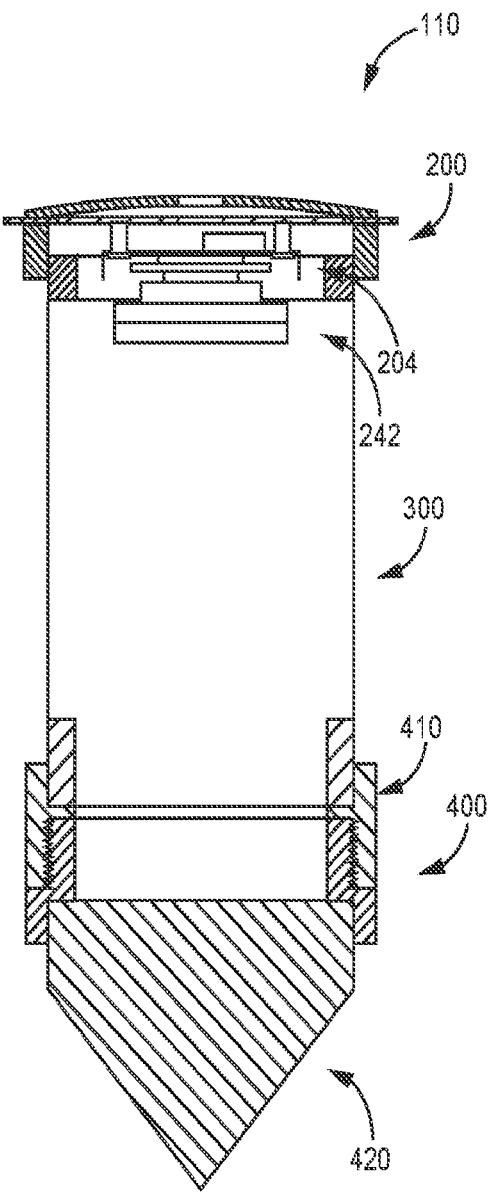
FIGS. 2A-B are views of a smart trap, according to some embodiments of this disclosure.
Figure 2B:
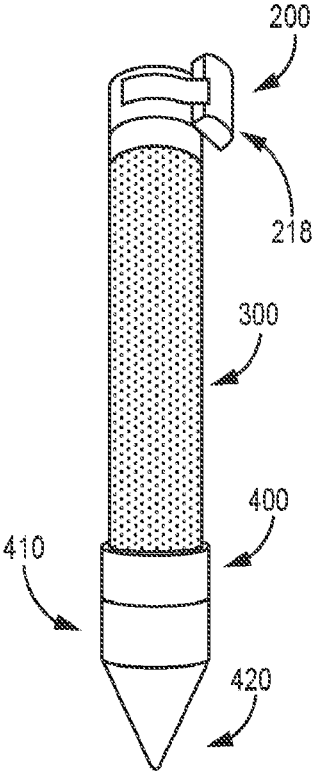

FIG. 2A is a schematic of a smart trap 110 and FIG. 2B is a photo of an exemplary embodiment of a smart trap 110. The smart trap 110 has a cap 200 that covers the top opening of the perforated cylinder 300 and forms the top of the smart trap 110. The cap 200 houses an electronic system 204 that includes a camera 242 with a lens. In one aspect, the smart trap 110 has a power source that may be attached to the cap 200. In one example, the power source is a battery 218, held by a battery clip, attached to the cap 200 (FIG. 2B).

The perforated cylinder 300 forms the body of the smart trap 110. In one example, an annulus connects the perforated chamber 300 to the cap 200. The diameter and length of the perforated chamber 300 are selected based on an appropriate force required to insert the trap into the grain mass and/or to provide an appropriate depth so the smart trap 110 is placed where the insects are active in the grain mass. The perforations are sized to admit insects into the smart trap 110 where they fall into the collection chamber 400. In one aspect, the size of the perforations allows insects to enter the smart trap 110 but prevents grain from filling the smart trap 110.

The collection chamber 400 has a base 410, a conical end 420, and is attached to the bottom of perforated chamber 300 to form the bottom of the smart trap 110. In one example, an annulus connects collection chamber 400 to the perforated chamber 300. The collection chamber 400 may be detachable. In one example, the collection chamber 400 has a threaded connection. Camera 242 is directed towards and has an unobstructed view of, the collection chamber 400.

In one aspect, the dimensions and shape of the smart trap 110 provide efficient features for attracting insects and easily insert the smart trap 110 into a grain mass (e.g. diameter, length, perforation diameter, conical end). Images of insects caught in the collection chamber 400 are captured by camera 242. In another aspect, the base 410 of the collection chamber 400 is white to increase the contrast and/or brightness of a captured image. In a further aspect, the conical nose 420 reduces the amount of force required to insert the smart trap 110 into a grain mass. The collection chamber 400 may be detached so that insects captured in the collection chamber 400 may be discarded. Placing the electronic system 204 in cap 200 allows the operator of the system 100 to easily repair and/or replace the entire electronic system 204 or one or more individual modules or boards associated with the electronic system 204.

Examples of some suitable materials for smart trap 110 include polyvinyl chloride (PVC) and stainless steel. In one example, the cap 200 is a PVC cap fitting. In one specific example, the cap 200 has a 2.4-inch inner diameter. The perforated chamber 300 may be connected to cap 200 and collection chamber 400 by a PVC annulus that matches the inner diameter of the perforated chamber. In another example, the perforated chamber 300 is made of stainless steel.

In one exemplary method of forming the collection chamber 400, a male piece is sealed at the bottom with a solid PVC nose cut to shape on a lathe, and a rubber O-ring is added to the connection. In one example, the collection chamber 400 is manufactured from a straight threaded polyvinyl chloride (PVC) connection.

Using a battery as a power source provides the smart trap 110 with a long lifespan. Another advantage is that each smart trap 110 has an independent power source. In one specific example, 240 mAh of energy is used every time the insect detection system 100 captures an image and sends the image to server 120. Table 1 shows the results of tests measuring the lifespan of different battery types based on the frequency at which images are taken by the imaging system.

Figure 4:
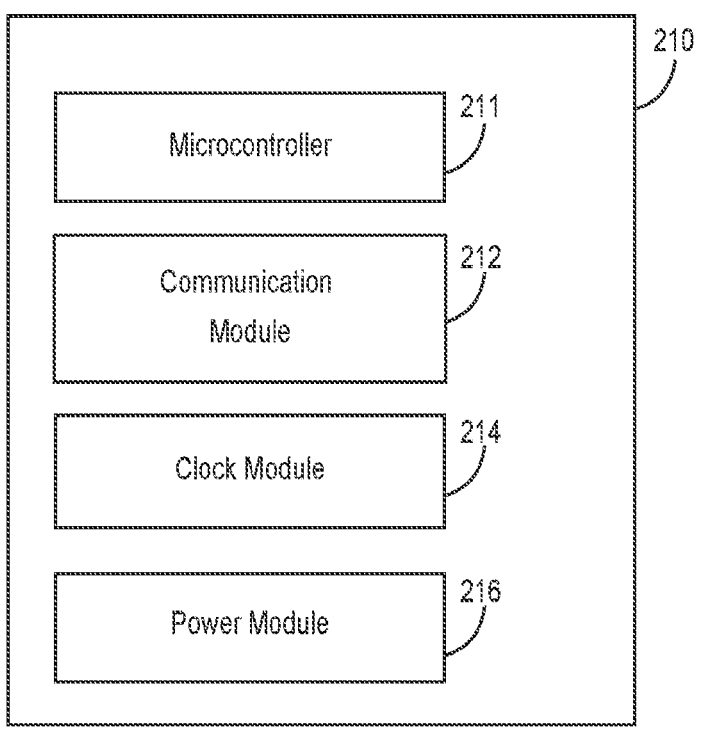
FIG. 4 is a block diagram of modules of a main board of a smart trap, according to some embodiments of this disclosure.

FIG. 4 is a block diagram of the main board 210. The main board 210 includes a microcontroller 211, a communication module 212, a clock module 214, and/or a power module 216 that includes a long-lasting power supply such as a battery. In one specific example, the main board 210 is an MCU ESP8266 board.

In one aspect, the microcontroller 211 communicates instructions to other modules of the system 204. For example, after an image is captured, the microcontroller 211 communicates 150 instructions to reset system 204 so that system 204 is ready to take another image. In another aspect, the microcontroller 211 processes data. For example, the microcontroller 211 converts the analog sensor readings to digital values. The microcontroller may also process an image captured by the imaging system 240, 242, 244, 246. In a further aspect, the microcontroller controls communication between server 120 and user device 130. In a further aspect, the microcontroller 211 may be programmed with instructions to power the system 204 only when a new

TABLE 1

| Lifespan of Battery According to Frequency of Image Capture | | | | | | | |
|---|---|---|---|---|---|---|---|
| | | Number of | Take Picture Every | | | | |
| Battery Type | Cost ($) | Batteries | 1 minute | 5 minutes | 10 minutes | 1 hour | 12 hours |
| AA Alkaline Battery 1.5 V, 2500 mAh | $14 for Pack of 48 | 3 | 11 hours | 2 days and 10 hours | 5 days | 1 month | 6 months |
| Li-Ion Battery 3.7 V, 3000 mAh | $15 for Pack of 4 | 1 | 12 hours | 2 days and 12 hours | 5 days | 1 month | 6 months |

Figure 3:
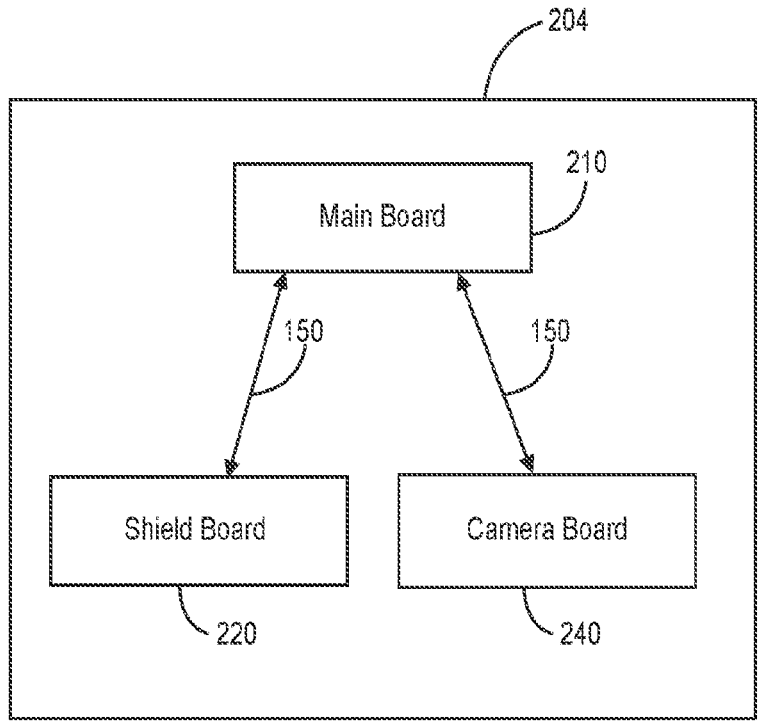
FIG. 3 is a block diagram of the systems of a smart trap, according to some embodiments of this disclosure.

FIG. 3 is a block diagram of the electronic system 204. In some embodiments, the electronic system 204 includes a main board 210, a shield board 220, and/or a camera board 240 that are communicatively coupled to one another via a or communication channel 150. Each board 210, 220, 240 is configured to execute at least one communication protocol. Examples of suitable communication protocols include the Inter-Integrated Circuit (I2C) protocol and the Serial Peripheral Interface (SPI) protocol. In one example, the I2C protocol is used for communication 150 between the main board 210 and the shield board 220, and the SPI protocol is used for communication 150 between the main board 210 and the camera board 240. In one aspect, each board 210, 220, and 240 is attached to another board. In one example, the main board 210 is connected to the shield board 220, which is connected to the camera board 240 (see e.g. FIG. 7).

To provide real-time monitoring and early detection of insect activity in stored grains, the electronic system 204 is configured to capture one or more images, provide light during image capture, sensors for measuring temperature and relative humidity, convert analog data into digital data, process images to count the number of insects in a captured image, process the ambient data, display/visualize the data, store data, and/or communicate information (e.g. data and/or instructions). In some embodiments, the main board 210 converts analog data into digital data, processes captured images, processes data, and/or communicates with the shield board 220, the camera board 240, server 120 and/or the user device 130. In some embodiments, the shield board 210 collects sensor data for ambient conditions, provides light during image capture, and/or communicates with the main board 210. In some embodiments, the camera board 240 captures one or more images and/or communicates with the main board 210.

command is received. In this example, a received instruction is added to a queue of instructions and, after the instruction is accepted, the imaging system 240, 242, 244, 246, and sensor module 224 are activated to collect the requested data.

In one aspect, clock module 214 assists in the implementation of time-dependent routines such as an image capture schedule or a power-saving routine, such as a deep sleep mode, to save power and increase the lifespan of the smart trap 110.

Figure 5:
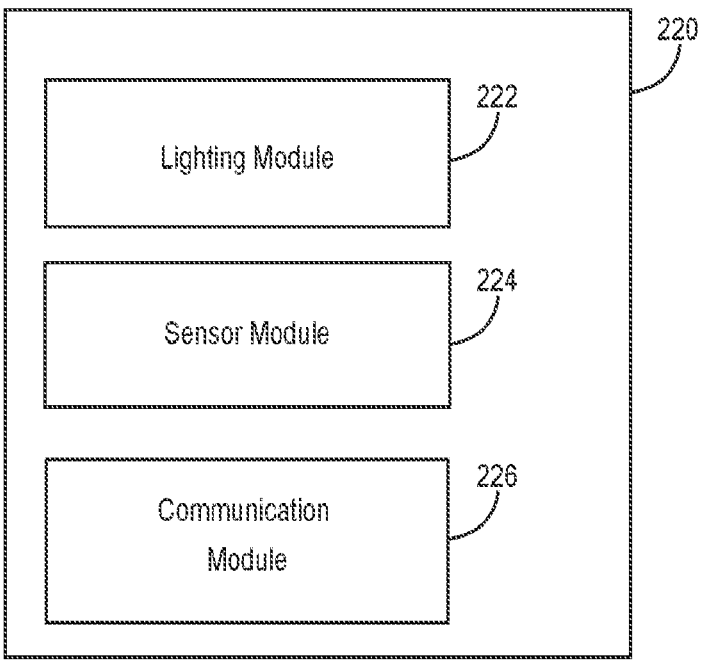
FIG. 5 is a block diagram of modules of the shield board, according to some embodiments of this disclosure.

FIG. 5 is a block diagram of the shield board 220. In some embodiments, the shield board 220 includes a lighting module 222, a sensor module 224, and a shield communication module 226. The lighting module 222 directs light towards the collection chamber 400 when an image is being captured by the camera 242, 244. The lighting module 222 has at least one light that is perpendicular to the collection chamber 400. The light may be flat. One or more light-emitting diodes (LEDs) may be used for the lighting module 222. The lighting module 222 may receive instructions from the microcontroller 211 to turn on, capture an image, and/or save the image to a temporary file on the main board 210. In some embodiments, the sensor module 224 has at least one sensor for monitoring and/or recording an ambient condition such as temperature and/or relative humidity. In some embodiments, the shield communication module 226 is utilized to provide communication with the main board 210. For example, the shield communication module 226 may receive instructions from the microcontroller 211 to turn on the lighting module 222 or collect sensor data from the sensor module 224. In one aspect, the shield communication module is a port expander. In one example, the port expander is an MCP23008 port expander.

Figure 6:
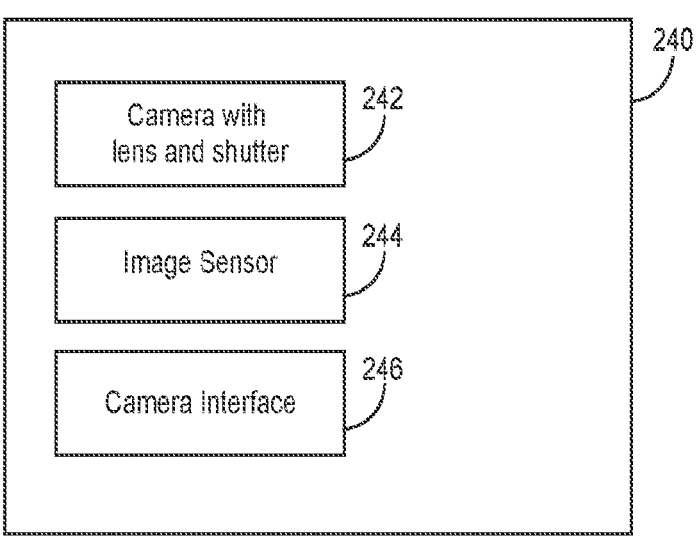
FIG. 6 is a block diagram of a camera board, according to some embodiments of this disclosure.

FIG. 6 is a block diagram of the camera board 240. The camera board 240 includes a camera interface 246, an image sensor 244, and a camera 242 with a lens and a shutter. In one example, the camera board 240 is an ArduCam 2 mega-pixel OV2640 camera. Camera 242 is connected to a camera board 240. In one aspect, camera 242 is a high-resolution camera. In another aspect, the camera interface 246 receives instructions from the main board 210 to keep the shutter open for a pre-determined amount of time. In addition, the shield communication module 226 may provide confirmation of lights being turned on and/or sensor data being collected by the sensor module 224. Camera 242 captures an image of the collection chamber 400. In one aspect, the captured image is a colored (RGB) image.

Figure 7:
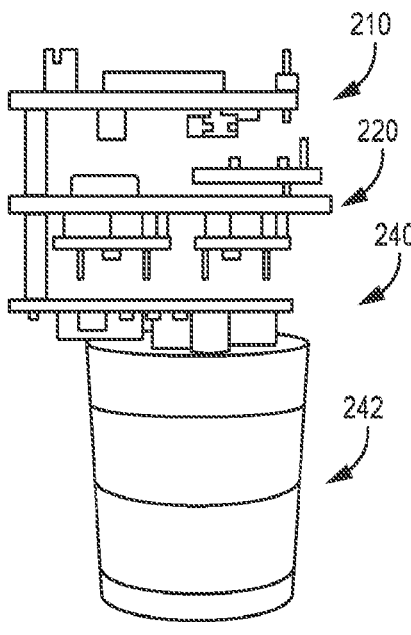
FIG. 7 shows an exemplary embodiment of an arrangement for the systems for a smart trap.
Figure 8A:
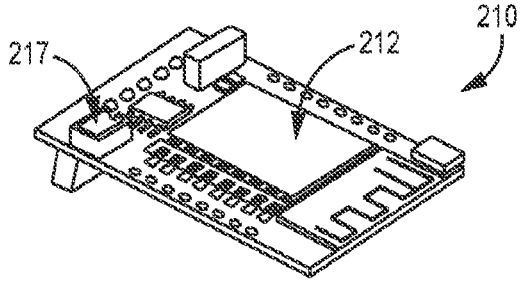
FIGS. 8A-B shows an exemplary embodiment of the main board, showing (A) the first side of the main board and (B) the second side of the main board.
Figure 8B:
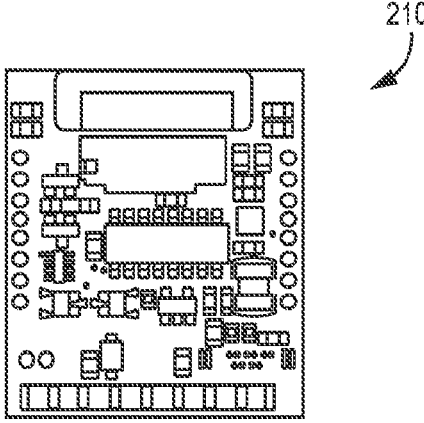
Figure 9A:
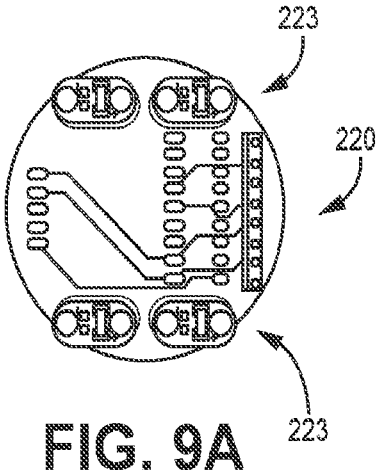
FIG. 9A-C shows an exemplary embodiment of the shield board, showing (A) the first side of the shield board; (B) the second side of the shield board; and (C) an exemplary connection schematic for the modules of the shield board.
Figure 9B:
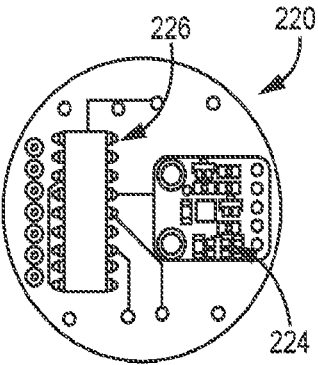
Figure 9C:
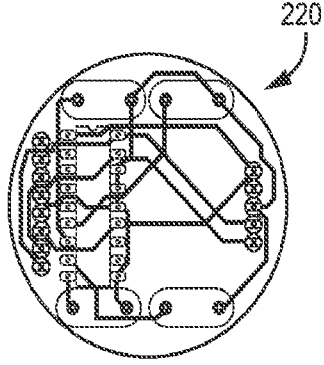
Figure 10A:
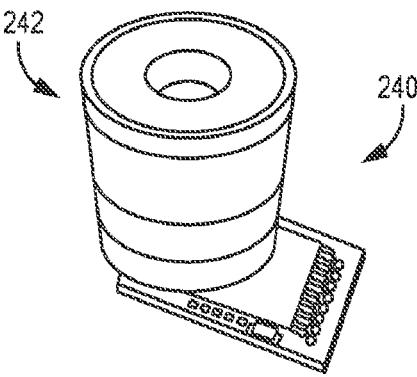
FIGS. 10A-B shows an exemplary embodiment of the camera board, showing (A) the first side of the camera board and (B) the second side of the camera board.
Figure 10B:
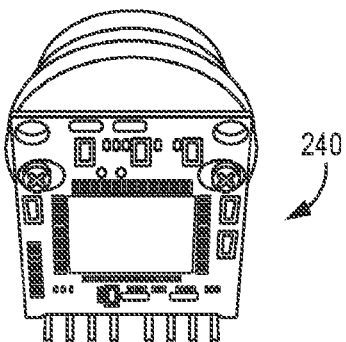

FIGS. 7-10B show exemplary embodiments of an insect detection system 100 as described herein. FIG. 7 shows an exemplary arrangement for the boards 210, 220, 240. In this example, the shield board 220 is positioned between the main board 210 and the camera board 240. The main board 210 is the top board and the camera board 240 is the bottom board. The boards 210, 220, 240 are connected by a vertical support (see rear left). The lighting module 222, located on the shield board 222 (as shown in FIG. 5), and the lens of the camera 242 are oriented in the same direction so that when shield board 222 is attached to the cap of a smart trap (as shown in FIG. 2A), the lighting module 222 and camera 242 are directed towards the collection chamber 400. FIGS. 8A-B show an exemplary main board 210. In this example, the power module 216 for the main board 210 includes a battery socket 217 receiving power from least one battery 218. The battery socket 217 and WiFi module 212 are located on the first side of the main board 210 (FIG. 8A). In some embodiments, the first side of the main board 210 may face upward when the main board 210 is housed in the cap 200. FIGS. 9A-C show an exemplary embodiment of a shield board 220. In this example, the lighting module is located on the first side of the shield board 220 and includes a plurality of light sources 223, e.g. LEDs (FIG. 9A). In some embodiments, the communication module 226 and sensor module 224 are located on the second side of the shield board 220, as shown in FIG. 9B. In this example, four LED lights form the lighting module 222. FIG. 9C shows the trace for the exemplary shield board 220 embodiment. FIGS. 10A-B show an exemplary camera board 240. Camera 242, 244 is attached to the first side (FIG. 10A)

In summary, an insect detection system 100 as disclosed herein is configured to acquire high resolution, high quality, images in a dark environment. Analyzing a high-resolution, high-quality image improves the accuracy of the insect count. First, a high-resolution camera produces a higher quality image. Furthermore, a white base 410 provides a higher contrast background for insects in a captured image, thereby producing a higher quality image. Also, uniform lighting provided by the lighting module 222 during the imaging process improves image quality. Additionally, instructions to keep the shutter open pre-determined amount of time are sent to the camera board 240 so that the image sensor 244 can absorb more light.

In an additional aspect, captured images are time stamped. The filename for an image may include identifying information such as the trap ID and the date and time the image was captured. In one aspect, a database is used to organize the captured images and/or processed images.

Figure 11:
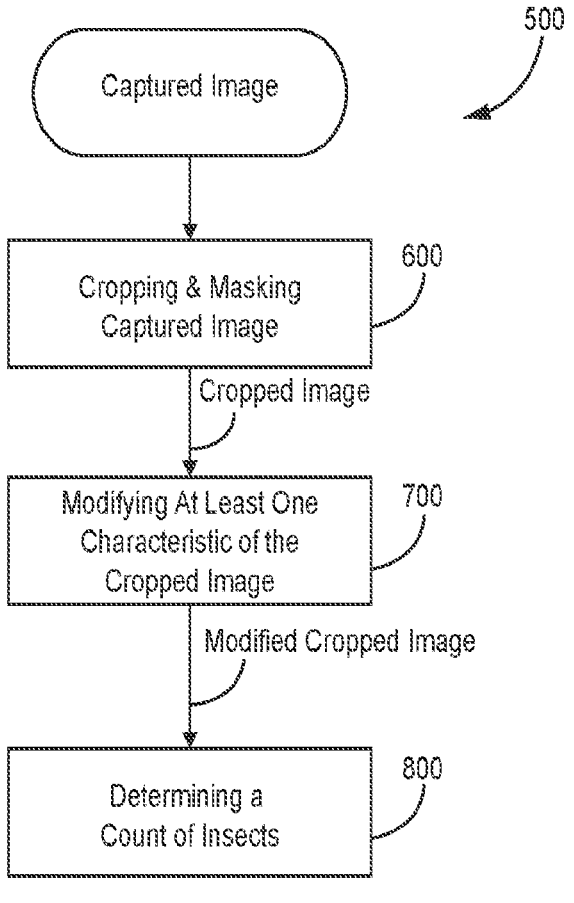
FIG. 11 is a flowchart of an algorithm to count the number of insects in an image, according to some embodiments of this disclosure.

FIG. 11 is a flowchart that illustrates a method 500 of analyzing images captured by the smart trap 110. In some embodiments, algorithm 500 determines the number of insects in each captured image. In some embodiments, the algorithm 500 may be executed by an image processor. The image processor may be the microcontroller 211 located in trap 110, server 120, and/or user device 130. In one example, algorithm 500 is a macro/function that may be executed by the microcontroller 211. At step 600, the captured image is cropped and masked to form a first processed image.

In one aspect, cropping and masking the captured image 600 removes extraneous areas and details of the captured image so that only the region in the captured image corresponding to the collection chamber 400 undergoes further processing and analysis. Thus, the first processed image for a circular collection chamber 400 is smaller than the captured image and includes only the region corresponding to the expected location of insects.

At step 700, the cropped/masked image is processed to modify one or more characteristics of the image. In some embodiments, modifying at least one characteristic of the cropped/masked image reduces noise, minimizes or negates fine particles and/or extraneous details, and/or converts the cropped/masked image into a binary image. These modifications, alone or in combination, increase the accuracy of the count of insects. Modifications include transforming the cropped/masked image into a single colored image (e.g. greyscale), adjusting the brightness and/or contrast of the image, binarizing the image, and/or reducing image noise and/or detail in the image. Binarization creates a binary image by converts a pixel image to a binary image and/or reduces noise in the image. Binarization may be conducted only on dark regions or on the entire image. Step 700 forms a second processed image that is a processed cropped image.

At step 800, the processed cropped image is analyzed to determine the count of insects in the image. The count of insects is a measure of grain infestation. The insect count and sensor data can be analyzed to determine a correlation between insect emergence and ambient conditions (e.g. temperature and/or relative humidity).

Figure 12:
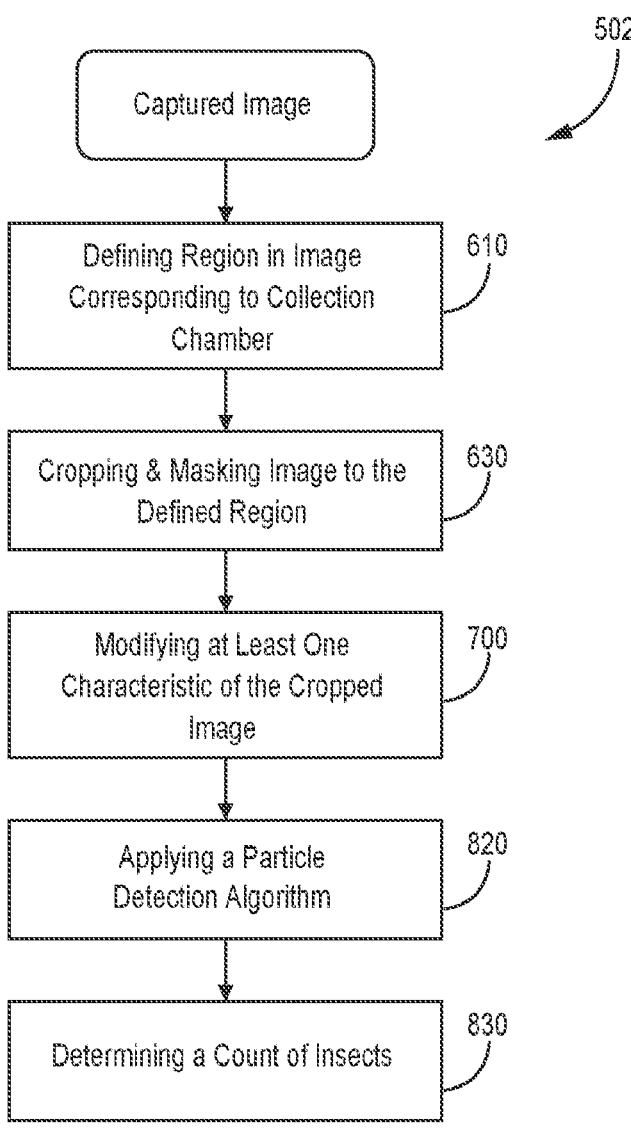
FIG. 12 is a flowchart of an algorithm to count the number of insects in an image according to some embodiments of this disclosure.

FIG. 12 is a flowchart that illustrates a method 502 of analyzing images captured by the smart trap 110. In some embodiments, the algorithm 502 determines the number of insects in each captured image. In some embodiments, the algorithm 502 may be executed on microcontroller 211, server 120, and/or user device 130. In one example, algorithm 502 is a macro that may be executed by the microcontroller 211.

At step 610, the captured image is analyzed to define a region in the image that corresponds to the collection chamber 400. At step 630, the captured image is cropped and masked the captured image to form a first processed image that contains only the region that corresponds to the collection chamber 400. In one example, step 630 includes reloading the captured image, cropping the captured image to fit the bounding box, and masking the corners of the bounding box to produce a circular image. At step 700, the cropped/masked image is processed to modify one or more characteristics of the image. In some embodiments, modifying at least one characteristic of the cropped/masked image reduces noise, minimizes or negates fine particles and/or extraneous details, and/or converts the cropped/masked image into a binary image. These modifications, alone or in combination, increase the accuracy of the count of insects. Modifications include transforming the cropped/masked image into a single colored image (e.g. greyscale), adjusting the brightness and/or contrast of the image, binarizing the image, and/or reducing image noise and/or detail in the image. Binarization creates a binary image by converts a pixel image to a binary image and/or reduces noise in the image. Binarization may be conducted only on dark regions or on the entire image. Step 700 forms a second processed image that is a processed cropped image. At step 820 a particle detection algorithm is applied to the processed cropped image. At step 830 the processed cropped image is analyzed to determine the count of insects in the image. The count of insects is a measure of grain infestation. The insect count and sensor data can be analyzed to determine a correlation between insect emergence and ambient conditions (e.g. temperature and/or relative humidity).

In one example, steps 610, 630, 820, and 830 of algorithm 502 are subroutines of the algorithm 500 shown in FIG. 11, with steps 610 and 630 being subroutines of cropping and masking the captured image 600 and steps 820 and 830 being subroutines of determining a count of insects 800.

Figure 13:
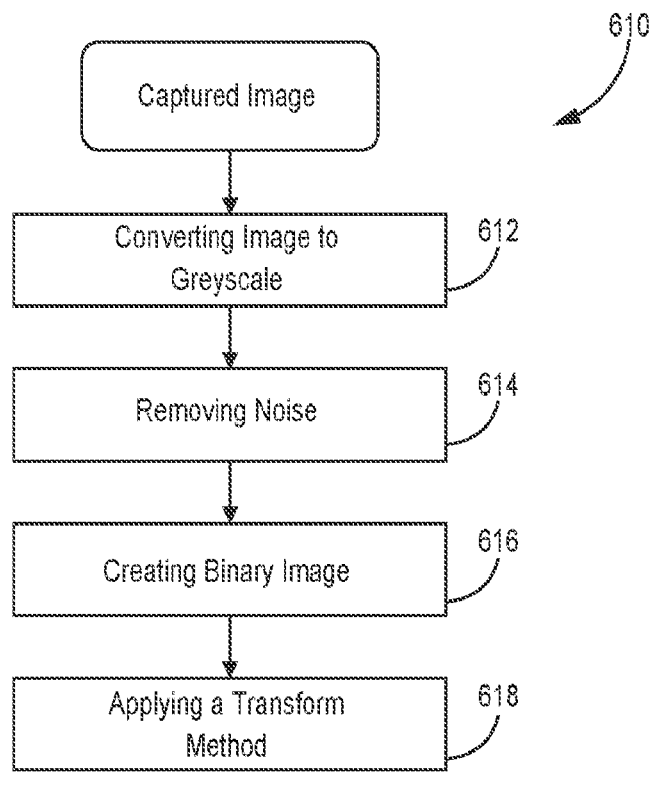
FIG. 13 is a flowchart of an exemplary subroutine for determining the region in a captured image that corresponds to the collection chamber.

FIG. 13 is a flowchart of an exemplary method 610 for determining a region in the captured image that corresponds to the collection chamber 400. At step 612, the captured image is converted to greyscale. At step 614, noise is removed from the captured image. In one example, step 614 includes applying an averaging method that removes noise while preserving edges. An example of a suitable averaging method is the median blur method. At step 616, the captured image is transformed into a binary image. At step 618, a transform method is applied to the captured image to define the region that corresponds to the collection chamber 400. In one example, step 618 applies the Hough Circle transform. The Hough Circle transform identifies at least one circular region in the captured image. Each identified region is delineated by a boundary box. An average of all identified bounding boxes is used to determine the center of the region in the captured image that corresponds to the collection chamber 400. In one aspect, the Hough Circle transform is applied to a binary image.

Figure 14:
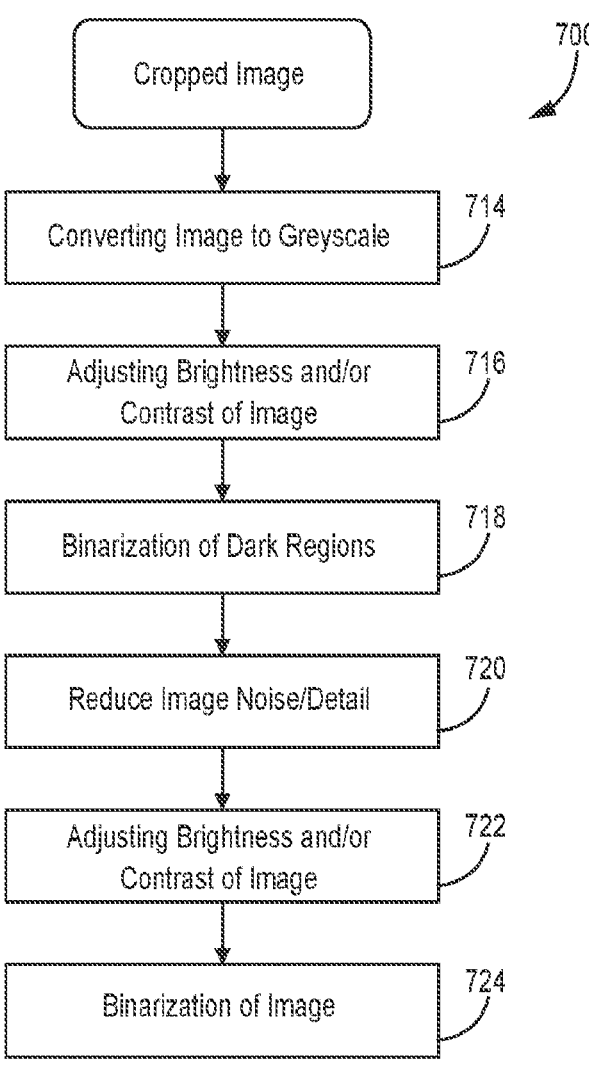
FIG. 14 is a flowchart of an exemplary subroutine for modifying one or more characteristics of the first processed image.

FIG. 14 is a flowchart of an exemplary method of modifying one or more characteristics of an image 700 to form a processed cropped image. At step 714, the cropped image is transformed into a single colored image (e.g. greyscale). At step 716, the brightness and/or contrast of the cropped image is adjusted. At step 718, dark regions of the cropped image are binarized. At step 720 the amount of noise and/or fine detail in the cropped image is reduced. In one embodiment, step 720 includes applying Gaussian Blur and Unsharp masking. Multiple applications of Gaussian Blue and Unsharp masking may be applied. The Gaussian Blur method reduces image noise/detail while the Unsharp Masking method increases the sharpness. At step 722, the brightness and/or contrast of the cropped image is adjusted again. At step 724, the entire cropped image is binarized.

Figure 15:
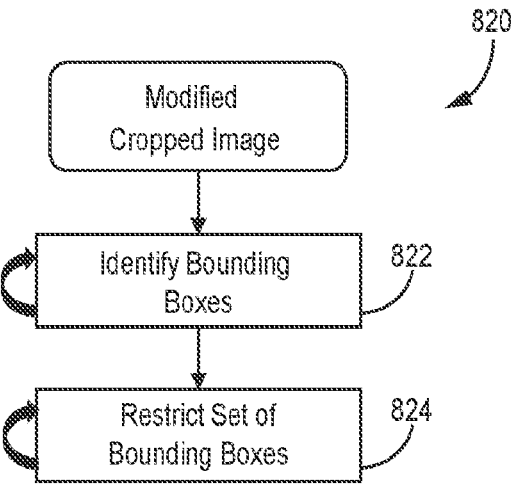
FIG. 15 is a flowchart of an exemplary subroutine particle detection algorithm, according to some embodiments of this disclosure. Arrows indicate that a step may be repeated at least one time before proceeding to the next step of the method.

FIG. 15 is a flowchart of an exemplary method for the particle detection algorithm 820. The insect number is determined by running a Python code. The code is used to process images by using an insect counting algorithm (ImageJ) to count the insects in each image and save the data. To count the insects, ImageJ is used to refine the image to eliminate any particles in the background and highlight the dark-colored insects via the following steps. At step 822, at least one bounding box is identified. In one example, identifying at least one bounding box 822 includes identifying regions of interest in the processed cropped image and delineating each region of interest with a bounding box, and placing the bounding box into a set of bounding boxes. At step 824, the set of bounding boxes is restricted/filtered to eliminate bounding boxes that are unlikely to contain an insect and/or keep bounding boxes with are likely to contain an insect. For example, a bounding box may surround an extraneous region that does not contain an insect. Bounding boxes to be analyzed in the count of insects may include bounding boxes within a certain area band, bounding boxes that only contain black pixels, bounding boxes that include an object with a specified eccentricity, and/or bounding boxes with an oval-shaped object. A count of the number of insects in the processed cropped image is determined by counting the insects in the subset of bounding boxes 830. In a further aspect, the insect count data may be saved to memory on server 120 and visualized by using the user interface for further analysis. The user interface, including mobile application, was designed to allow the user to easily see the data related to insect number, temperature, and relative humidity. Additionally, a graph may be used to visualize the insect count over time. The mobile application also has an additional feature which allows user to view past data.

Any suitable programming language may be used to implement instructions for insect detection system 100, algorithm 500, and user interface. Some examples include Python, C++, HTML5, CSS3, and/or JavaScript.

The effectiveness and accuracy of an insect detection system 100 as described herein was evaluated in a laboratory setting and a commercial setting. The effectiveness, recovery rate, and insect counting accuracy rate were examined. Additionally, the temperature and relative humidity of ambient air inside and outside of storage, and rice moisture were measured during the tests.

The laboratory setting was a cylindrical container filled with rice infested with red flour beetles. The cylindrical container had a diameter of 20 cm, a height of 48 cm, and contained 8 kg of infested rice. The system was tested under different infestation concentrations (4 insects/8 kg, 8 insects/8 kg, 16 insects/8 kg, and 24 insects/8 kg of rough rice) which is equal to (0.5/kg, 1/kg, 2/kg, and 3/kg). Three tests were conducted for each concentration.

Table 2 shows the effectiveness and recovery rate of the system. The system can detect the emergence of the first insect within 19, 18, 20, and 20 minutes under infestation concentrations of 0.5/kg, 1/kg, 2/kg, and 3/kg, respectively (Table 2). The corresponding recovery rates of total insects were 83%, 75%, 73%, and 76% after 24 hours. For an insect concentration of 0.5 insects/kg, the system detected the emergence of the first insect within 12, 16, and 29 minutes for replicates 1, 2, and 3 respectively (Table 2). The corresponding values for recovery rates of total insects were 75%, 100%, and 75%, respectively. For an insect concentration of 1 insect/kg, the system detected the emergence of the first insect within 33, 17, and 4 minutes, for replicates 1, 2, and 3 respectively (Table 2). The corresponding values for recovery rates of total insects were 75%, 75%, and 75%, respectively. For a concentration of 3 insects/kg, the system detected the emergence of the first insect within 29, 18, and 13 minutes for replicate 1, 2, and 3, respectively. The corresponding values for recovery rates of total insects were 80%, 71%, and 80%, respectively.

TABLE 2

| Effectiveness and Recovery Rate of the System During Laboratory Test | | | | | |
|---|---|---|---|---|---|
| Infestation Concentration | Total (Insects/8 kg rough rice) | Replicate | Time to detect first insect (min) | Insects detected after 24 hr | Recovery Rate |
| 0.5/kg | 4.0 | R1 | 12 | 3 | 75 |
| | | R2 | 16 | 4 | 100 |
| | | R3 | 29 | 3 | 75 |
| | | Average | 19 | 3 | 83 |
| 1/kg | 8.0 | R1 | 33 | 6 | 75 |
| | | R2 | 17 | 6 | 75 |

TABLE 2-continued

| | Effectiveness and Recovery Rate of the System During Laboratory Test | | | | |
|---|---|---|---|---|---|
| Infestation Concentration | Total (Insects/8 kg rough rice) | Replicate | Time to detect first insect (min) | Insects detected after 24 hr | Recovery Rate |
| | | R3 | 4 | 6 | 75 |
| | | Average | 18 | 6 | 75 |
| 2/kg | 16.0 | R1 | 14 | 13 | 81 |
| | | R2 | 26 | 12 | 75 |
| | | R3 | 21 | 10 | 62.5 |
| | | Average | 20 | 11.7 | 73 |
| 3/kg | 24.0 | R1 | 29 | 19 | 80 |
| | | R2 | 18 | 17 | 71 |
| | | R3 | 13 | 19 | 80 |
| | | Average | 20 | 18.3 | 76 |

The recovery rate is the percentage of the insects detected after 24 hours compared to the total number of insects in the infested rice. The recovery rate of total insects can be calculated using the following equation:

$$RR(\%) = \frac{NID_{24hr}}{TNI_{8kg}} \times 100$$

where RR is recovery rate (%), $NID_{24\,hr}$ is the number of insects detected after 24 hours, and $TNI_{8\,kg}$ is the total number of insects infesting the 8 kg of rice.

Table 3 shows the insect counting accuracy rate of the system during the laboratory test. The insect counting accuracy rate is the difference between the number of insects visually counted and those counted by the system. The system achieved high counting accuracy of 93% and 95.6% for 1/kg and 2/kg, respectively (Table 3). The average image counting accuracy rate was 94.3%.

TABLE 3

| | Insect Counting Accuracy Rate of the System During the Laboratory Test | | | |
|---|---|---|---|---|
| Concentration | Time (hr) | Detected Insects (visual count) | Detected Insects (system count) | Counting Accuracy Rate (%) |
| 1 insect/kg | 0.3 | 1 | 1 | 100 |
| | 0.9 | 2 | 2 | 100 |
| | 1.3 | 3 | 3 | 100 |
| | 6.4 | 4 | 5 | 75 |
| | 10.0 | 5 | 5 | 100 |
| | 12.7 | 6 | 7 | 83 |
| | 24.0 | 6 | 7 | 83 |
| | Average | | | 93 |
| 2 insects/kg | 0.2 | 1 | 1 | 100 |
| | 00.5 | 3 | 3 | 100 |
| | 1.3 | 4 | 4 | 100 |
| | 2.8 | 6 | 6 | 100 |
| | 8.2 | 9 | 8 | 89 |
| | 14.4 | 13 | 11 | 85 |
| | 24.0 | 13 | 11 | 85 |
| | Average | | | 95.6 |

The insect counting accuracy rate can be calculated using the following equation:

$$ICAR(\%) = \left(1 - \frac{\Delta D}{NIVC}\right) \times 100$$

where ICAR is the image counting accuracy rate (%), $\Delta D$ is the difference between the number of insects visually counted and those counted by the system, and NIVC is the number of insects visually counted.

Table 4 provides the averages and standard deviations of temperatures and relative humidity recorded by the system and thermometer during the laboratory test. The overall average and standard deviation for temperature and relativity recorded by the system were 26.5±0.6° C. and 30±0.7%, respectively. The corresponding values recorded by the thermometer were 24.5±1.0° C. and 32.5±0.8%, respectively (Table 4).

TABLE 4

| | Averages and Standard Deviations of temperatures and Relative Humidity Recorded by the System and Thermometer During the Laboratory Test | | | |
|---|---|---|---|---|
| | System Reading | | Meter Reading | |
| Time (hr) | Temperature (° C.) | Humidity (%) | Temperature (° C.) | Humidity (%) |
| 0 | 27.1 ± 0.6 | 30.0 ± 1.2 | 25.4 ± 0.9 | 32.0 ± 1.9 |
| 1 | 27.3 ± 0.9 | 31.0 ± 0.8 | 25.5 ± 0.8 | 32.0 ± 1.5 |
| 2 | 27.5 ± 0.7 | 30.0 ± 0.9 | 25.4 ± 1.1 | 33.0 ± 1.7 |
| 3 | 27.9 ± 0.3 | 30.0 ± 0.9 | 26.4 ± 0.9 | 33.0 ± 1.8 |
| 4 | 27.4 ± 0.8 | 31.0 ± 0.9 | 25.3 ± 1.0 | 33.0 ± 1.5 |
| 5 | 27.3 ± 0.8 | 30.0 ± 0.9 | 26.2 ± 1.1 | 33.0 ± 1.9 |
| 6 | 27.2 ± 0.6 | 30.0 ± 0.7 | 25.1 ± 1.2 | 33.0 ± 1.8 |
| 7 | 26.9 ± 0.9 | 30.0 ± 1.1 | 23.9 ± 1.2 | 32.0 ± 2.0 |
| 8 | 26.6 ± 0.3 | 30.0 ± 1.2 | 23.9 ± 1.1 | 32.0 ± 2.1 |
| 9 | 26.4 ± 0.6 | 30.0 ± 0.8 | 22.8 ± 0.9 | 33.0 ± 2.0 |
| 10 | 26.3 ± 0.7 | 31.0 ± 0.7 | 24.7 ± 1.1 | 34.0 ± 1.8 |
| 11 | 26.2 ± 0.5 | 31.0 ± 0.9 | 23.7 ± 0.8 | 33.0 ± 1.8 |
| 12 | 26.0 ± 0.8 | 31.0 ± 0.7 | 23.6 ± 1.2 | 34.0 ± 2.1 |
| 13 | 26.1 ± 0.9 | 30.0 ± 0.8 | 23.6 ± 0.9 | 32.0 ± 1.9 |
| 14 | 26.0 ± 0.9 | 30.0 ± 1.2 | 23.5 ± 1.0 | 32.0 ± 1.9 |
| 15 | 26.0 ± 0.9 | 30.0 ± 1.1 | 23.4 ± 1.2 | 32.0 ± 1.8 |
| 16 | 25.8 ± 0.3 | 30.0 ± 1.2 | 23.2 ± 1.0 | 33.0 ± 1.7 |
| 17 | 25.7 ± 0.7 | 30.0 ± 1.1 | 23.2 ± 1.1 | 33.0 ± 1.4 |
| 18 | 26.0 ± 0.8 | 30.0 ± 0.9 | 24.4 ± 0.9 | 33.0 ± 1.2 |
| 19 | 26.2 ± 0.4 | 29.0 ± 0.7 | 24.5 ± 1.0 | 33.0 ± 1.1 |
| 20 | 26.3 ± 0.7 | 29.0 ± 0.9 | 24.7 ± 1.2 | 33.0 ± 1.6 |
| 21 | 26.4 ± 0.9 | 29.0 ± 0.8 | 24.8 ± 1.1 | 31.0 ± 1.7 |
| 22 | 26.7 ± 1.0 | 29.0 ± 1.1 | 23.9 ± 1.2 | 31.0 ± 1.8 |
| 23 | 27.0 ± 0.6 | 29.0 ± 1.0 | 25.0 ± 1.0 | 31.0 ± 1.4 |

The commercial setting was a commercial storage facility with rice. The rice in the commercial storage facility was visually inspected before and after three traps were installed. Visual inspection of the commercial storage facility included taking samples from nine different locations and inspecting the samples using a screening method to determine that the rice was not infested. The tests in the commercial setting were done in triplicate. For each replicate, the system was installed and left for one week. During that time, insect activity was remotely monitored. After 7 days, the traps were inspected, and the trapped insects were visually counted and compared with those detected by the system.

Table 5 provides data relevant to the effectiveness and early detection of insect activity by the insect system in a commercial setting. The system was able to detect the emergence of the first, second, and third insects within 10, 40, and 130 minutes for trap number 1 (Table 5). The corresponding values for trap numbers 2 and 3 were 11, 42, 120 minutes, and 15, 43, and 130 minutes, respectively (Table 5).

TABLE 5

| | | | | | |
|---|---|---|---|---|---|
| Effectiveness and Early Detection of Insect Activity During Commercial Storage Tests | | | | | |
| | | Time to Detect Insect (minutes) | | | |
| Trap No. | Insect | Test 1 | Test 2 | Test 3 | Average |
| 1 | First | 10 | 10 | 9 | 10 |
| | Second | 30 | 50 | 40 | 40 |
| | Third | 90 | 120 | 180 | 130 |
| 2 | First | 10 | 12 | 10 | 11 |
| | Second | 40 | 35 | 50 | 42 |
| | Third | 90 | 180 | 90 | 120 |
| 3 | First | 15 | 20 | 10 | 15 |
| | Second | 50 | 45 | 35 | 43 |
| | Third | 180 | 120 | 90 | 130 |

Table 6 shows the insect counting accuracy rate of the system in a commercial setting. Analysis of the data revealed that it took only 12 minutes to detect insect activity with an accounting accuracy of 91.3%. For trap number 1, the results revealed that the counting accuracy was 100%, 91.7%, and 90% for the first, second, and third tests, respectively (Table 6). The corresponding values for trap numbers 2 and 3 were 75%, 100%, 88.9%, and 88.9%, 87.5%, and 100%, respectively (Table 6).

TABLE 6

| | | | | |
|---|---|---|---|---|
| Insect Counting Accuracy of the System During Commercial Storage Tests | | | | |
| Trap No. | Detected Insects | Test 1 | Test 2 | Test 3 |
| 1 | Visual Count | 7 | 12 | 10 |
| | System Count | 7 | 11 | 9 |
| | Accuracy (%) | 100 | 91.7 | 90 |
| 2 | Visual Count | 8 | 6 | 9 |
| | System Count | 6 | 6 | 8 |
| | Accuracy (%) | 75 | 100 | 88.9 |
| 3 | Visual Count | 9 | 8 | 12 |
| | System Count | 8 | 7 | 12 |
| | Accuracy (%) | 88.9 | 87.5 | 100 |

Table 7 shows the averages and standard deviations of temperatures and relative humidity recorded by the system and thermometer during the commercial storage tests. The overall averages and standard deviations for the temperature recorded by the system sensors were 31.2±4.5, 30.9±5.0, and 31.7±3.8° C. for trap numbers 1, 2, and 3, respectively, (Table 7). The corresponding values recorded by the thermometer were 30.5±4.0, 29.3±2.1, and 30.1±3.1° C., respectively. While, the overall average and standard deviation for the relative humidity recorded by the system sensors were 49.5±11, 50±10, and 50±12% for trap numbers 1, 2, and 3, respectively (Table 7). The corresponding values recorded by the thermometer were 49±10, 48±11, and 48±10%, respectively. The average ambient temperatures inside and outside the storage were 25.7±4.6° C. and 28.1±8.6° C., respectively. The corresponding values for relative humidity were 46.9±5.3% and 45.4±12.6%. The average moisture content of stored rice was 11.8±0.5%, respectively.

TABLE 7

| | Temperature (° C.) | | Humidity (%) | |
|---|---|---|---|---|
| Averages and Standard Deviations of Temperatures and Relative Humidity Recoded by the System and Thermometer During the Commercial Storage Tests. | | | | |
| Trap No. | System Sensor | Meter | System Sensor | Meter |
| 1 | 31.2 ± 4.5 | 30.5 ± 4.0 | 49.5 ± 11 | 49 ± 10 |
| 2 | 30.9 ± 5.0 | 29.3 ± 2.1 | 50.0 ± 10 | 48 ± 11 |
| 3 | 31.7 ± 3.8 | 30.1 ± 3.1 | 50.0 ± 12 | 48 ± 10 |

As can be seen from the data, the results obtained from the commercial storage facility were consistent with those obtained from the laboratory test setting.

Figure 16:
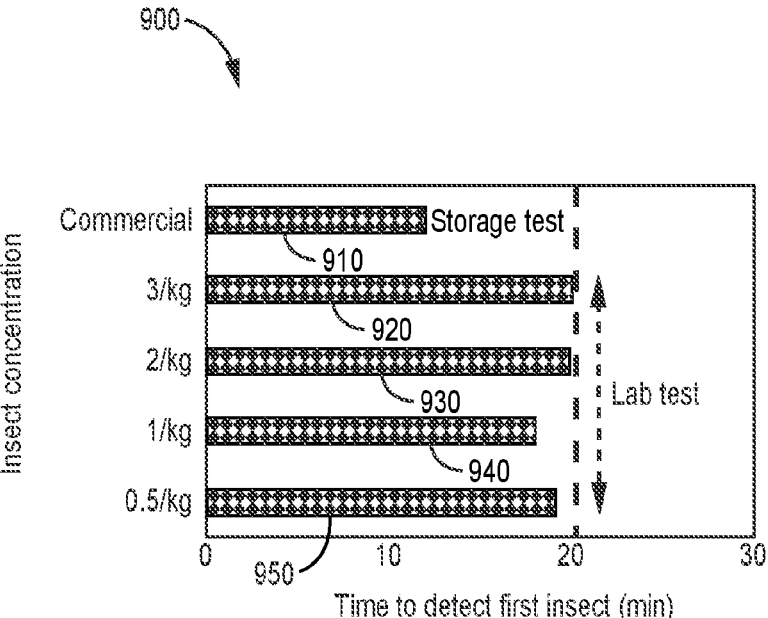
FIG. 16 is a graph showing the time to detect the emergence of the first insect during lab and commercial tests of an insect system according to some embodiments of this disclosure.

In summary, the system as described herein can detect insect activity during lab and commercial storage tests in less than 20 minutes with a counting accuracy of more than 90% (FIG. 16). Specifically, the system detected insect activity during the commercial setting test within 12 minutes with a counting accuracy of 91.3%.

Discussion of Possible Embodiments

According to one aspect, a system for real-time monitoring of insects includes a trap and an image processor. The trap includes a chamber with perforations sized to admit insects into an interior of the smart trap, a collection chamber located within the interior of the smart trap, and an imaging system for capturing images that include the collection chamber of the smart trap. The image processor is configured to receive images captured by the smart trap and to determine a count of insects within the collection chamber based on image analysis of the received image, wherein image analysis includes identifying a region within the received image corresponding with a boundary of the collection chamber, cropping the received image to the identified region to generate a cropped image, modifying at least one characteristic of the cropped image to generate a modified, cropped image, and determining a count of insects based on the modified, cropped image.

The system of the preceding paragraph can optionally include, additionally and/or alternatively any, one or more of the following features, configurations, and/or additional components.

For example, in some embodiments, the image processor is included as part of the smart trap.

In some embodiments, the system further includes a server located remotely from the smart trap, wherein the server is communicatively coupled to the smart trap to receive data from the smart trap.

In some embodiments, the image processor is located on the server, and wherein data received from the smart trap includes images captured by the smart trap.

In some embodiments, wherein identifying a region within the received image corresponding with a boundary of the collection chamber includes applying a Hough Circle transform to the captured image to identify the region in the received image corresponding with the boundary of the collection chamber.

In some embodiments, wherein modifying at least one characteristic of the cropped image includes one or more of converting the cropped image to greyscale, adjusting brightness/contrast of the cropped image, binarizing dark regions of the cropped image, reducing image/noise of the cropped image, and binarizing the cropped image.

In some embodiments, wherein determining a count of insects based on the modified, cropped image includes applying a particle detection algorithm to the modified, cropped image.

In some embodiments, wherein applying the particle detection algorithm includes identifying a bounding box for each region of interest in the second processed image, placing the bounding box into a set of bounding boxes, filtering the set of bounding boxes to a subset of bounding boxes, counting the insects in the subset of bounding boxes to determine a count of insects in the captured image.

In some embodiments, wherein filtering the set of bounding boxes includes restricting bounding boxes in the set to bounding boxes based on one or more of location of the bounding box within a certain area band, presence of black pixels within the bounding box, presence of object having a specified eccentricity; and/or presence of an object having an oval-shaped object.

In some embodiments, wherein the particle detection algorithm determines a count of insects from a subset of bounding boxes, each bounding box identifying a region of interest in the modified, cropped image.

According to another aspect, a trap for detecting insects includes a perforated chamber with openings sized to admit insects into an interior of the trap, a collection chamber located within the interior of the smart trap for collecting admitted insects, and a cap configured to cover the perforated chamber, the cap housing an electronic system including an imaging system to capture an image of the collection chamber.

The trap of the preceding paragraph can optionally include, additionally and/or alternatively any, one or more of the following features, configurations, and/or additional components.

In some embodiments, the electronic system further including a lighting module for lighting the collection chamber when the imaging system captures an image.

In some embodiments, the electronic system further including a sensor module for collecting data on one or more ambient conditions.

In some embodiments, the imaging system includes a camera board, the system further comprising: a main board having a microcontroller and a communication module, and a shield board having a lighting module; wherein the main board, the shield board, and the camera board are stacked horizontally with the shield board positioned between the main board and the camera board.

In some embodiments, the microcontroller is configured to provide instructions to the shield board and the camera board, wherein instructions include instructions to the lighting module to illuminate the interior of the smart trap and instructions to the camera board to capture an image of the interior of the smart trap.

According to another aspect, a method of counting insects in a captured image includes cropping and masking the captured image to produce a first processed image containing only a region in the captured image that correlates to a collection chamber, modifying at least one characteristic of the first processed image to produce a second processed image, and determining a count of insects in the captured image by executing a particle detection algorithm on the second processed image.

The method of the preceding paragraph can optionally include, additionally and/or alternatively any, one or more of the following features, configurations, and/or additional components.

In some embodiments, cropping and masking the captured image includes applying a Hough Circle transform to define the region.

In some embodiments, modifying at least one characteristic of the first processed image makes any insects in the first processed image more pronounced for easier identification by the particle detection algorithm.

In some embodiments, modifying at least one characteristic of the first processed image includes one or more of converting the first processed image to greyscale, adjusting brightness/contrast of the first processed image, binarizing dark regions of the first processed image, reducing image/noise of the first processed image, and binarizing the first processed image.

In some embodiments, the particle detection algorithm includes determining a count of insects from a subset of bounding boxes, each bounding box identifying a region of interest in the second processed image.

In some embodiments, the particle detection algorithm further includes identifying a bounding box for each region of interest in the second processed image; placing the bounding box into a set of bounding boxes; filtering the set bounding boxes to a subset of bounding boxes; and counting insects in the subset of bounding boxes to determine a count of insects in the captured image.

In some embodiments, filtering the set of bounding boxes includes restricting bounding boxes in the set to bounding boxes based on one or more of location of the bounding box within a certain area band, presence of black pixels within the bounding box, presence of object having a specified eccentricity; and/or presence of an object having an oval-shaped object.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A system for real-time monitoring of insects comprising:

a smart trap comprising:

a chamber with perforations sized to admit insects into an interior of the smart trap;

a collection chamber located within the interior of the smart trap;

a cap covering a top opening of the chamber, the cap housing an electronic system comprising an imaging system for capturing images that include the collection chamber of the smart trap; and an image processor configured to receive images captured by the smart trap and to determine a count of insects within the collection chamber based on image analysis of the received image, wherein image analysis includes identifying a region within the received image corresponding with a boundary of the collection chamber, cropping the received image to the identified region to generate a cropped image, modifying at least one characteristic of the cropped image to generate a modified, cropped image, and determining a count of insects based on the modified, cropped image;

wherein determining the count of insects based on the modified, cropped image comprises applying a particle detection algorithm, wherein the particle detection algorithm comprises:

identifying one or more bounding boxes, each bounding box identifying a region of interest in the modified, cropped image;

placing the bounding box into a set of bounding boxes;

filtering the set bounding boxes to a subset of bounding boxes likely to contain an insect; and counting insects in the subset of bounding boxes to determine the count of insects.

2. The system of claim 1, wherein the image processor is included as part of the smart trap.

3. The system of claim 1, further including a server located remotely from the smart trap, wherein the server is communicatively coupled to the smart trap to receive data from the smart trap, wherein the image processor is located on the server and wherein data received from the smart trap includes images captured by the smart trap.

4. The system of claim 1, wherein identifying a region within the received image corresponding with a boundary of the collection chamber includes applying a Hough Circle transform to the captured image to identify the region in the received image corresponding with the boundary of the collection chamber.

5. The system of claim 1, wherein modifying at least one characteristic of the cropped image includes one or more of converting the cropped image to greyscale, adjusting brightness/contrast of the cropped image, binarizing dark regions of the cropped image, reducing image/noise of the cropped image, and binarizing the cropped image.

6. The system of claim 1, wherein filtering the set of bounding boxes to the subset of bounding boxes likely to contain an insect includes restricting bounding boxes in the set to bounding boxes based on one or more of location of the bounding box within a certain area band, presence of black pixels within the bounding box, presence of object having a specified eccentricity; and/or presence of an object having an oval-shaped object.

7. A smart trap for detecting insects, comprising:

a perforated chamber with openings sized to admit insects into an interior of the smart trap;

a collection chamber located within the interior of the smart trap for collecting admitted insects; and a cap configured to cover the perforated chamber;

an electronic system housed in the cap, the electronic system comprising:

a main board including a microcontroller and a communication module;

a shield board including a lighting module configured to illuminate the collection chamber during image capture;

a camera board including an imaging system to capture an image of the collection chamber;

wherein the main board, the shield board, and the camera board are stacked with the shield board positioned between the main board and the camera board, and the microcontroller is configured to provide instructions to control the lighting module to illuminate the collection chamber and to control the camera board to capture the image.

8. The smart trap of claim 7, the electronic system further including a sensor module for collecting data on one or more ambient conditions.

9. The trap of claim 7, wherein;

a shield board further comprising a communication module configured to communicate with the lighting module and the main board.

10. A method of counting insects in a captured image, comprising:

cropping and masking the captured image to produce a first processed image containing only a region in the captured image that correlates to a collection chamber;

modifying at least one characteristic of the first processed image to produce a second processed image; and determining a count of insects in the captured image by executing a particle detection algorithm on the second processed image, wherein the particle detection algorithm includes:

identifying one or more bounding boxes, each bounding box identifying a region of interest in the second processed image;

placing the bounding box into a set of bounding boxes;

filtering the set bounding boxes to a subset of bounding boxes likely to contain an insect; and counting insects in the subset of bounding boxes to determine a count of insects in the captured image.

11. The method of claim 10, wherein cropping and masking the captured image includes applying a Hough Circle transform to define the region.

12. The method of claim 10, wherein modifying at least one characteristic of the first processed image makes any insects in the first processed image more pronounced for easier identification by the particle detection algorithm.

13. The method of claim 10, wherein modifying at least one characteristic of the first processed image includes one or more of converting the first processed image to greyscale, adjusting brightness/contrast of the first processed image, binarizing dark regions of the first processed image, reducing image/noise of the first processed image, and binarizing the first processed image.

14. The method of claim 10, wherein filtering the set of bounding boxes to a subset of bounding boxes likely to contain an insect includes restricting bounding boxes in the set to bounding boxes based on one or more of location of the bounding box within a certain area band, presence of black pixels within the bounding box, presence of object having a specified eccentricity; and/or presence of an oval-shaped object.

15. The trap of claim 7, wherein the collection chamber comprises a white base.

16. The trap of claim 9, wherein the shield board further comprises a sensor module comprising at least one sensor configured to collect data about an ambient condition, wherein the microcontroller is further configured to provide instructions to the shield board to collect sensor data.

17. The system of claim 1, the electronic system further comprising a microcontroller, wherein the microcontroller is configured to provide instructions to the imaging system to capture an image of the interior of the smart trap.

18. The system of claim 17, wherein:
a camera board comprising the imaging system, the imaging system comprising:
a camera; and
a camera interface configured to receive instructions from a main board the electronic system further comprising:
the main board comprising:
a power module comprising a battery socket for receiving power from at least one battery; and
a communication module;
a shield board comprising:
a lighting module and
a communication module configured to communicate with the lighting module and the main board;
wherein the main board, the shield board, and the camera board are stacked horizontally with the shield board positioned between the main board and the camera board.

19. The system of claim 18, the shield board further comprising:
a sensor module comprising at least one sensor for monitoring and/or recording an ambient condition;
wherein:
the communication module of the shield board is configured to provide confirmation of lights being turn on and/or sensor data being collected by the sensor module;
the lighting module is located on a first side of the shield board, the first side directed towards the collection chamber; and
the sensor and communication modules are located on a second side of the shield board.

*   *   *   *   *